(12) United States Patent
Hunziker et al.

(10) Patent No.: US 6,509,987 B1
(45) Date of Patent: Jan. 21, 2003

(54) CHANNEL BAND CONVERSION APPARATUS FOR OPTICAL TRANSMISSION SYSTEMS

(75) Inventors: Guido H. Hunziker, Highlands, NJ (US); Stan Lumish, Red Bank, NJ (US); Jianhui Zhou, Freehold, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/371,165

(22) Filed: Aug. 10, 1999

(51) Int. Cl.[7] ............................................. H04J 14/02
(52) U.S. Cl. ...................................... 359/124; 359/154
(58) Field of Search ................................. 359/124, 180, 359/154, 174, 176

(56) References Cited

U.S. PATENT DOCUMENTS 6,353,490 B1 * 3/2002 Singer et al. ............ 359/124 X

FOREIGN PATENT DOCUMENTS

| JP | 86099 | * 3/2001 |
| JP | 274750 | * 10/2001 |

* cited by examiner

*Primary Examiner*—Thomas Mullen
(74) *Attorney, Agent, or Firm*—Steve Mendelsohn

(57) ABSTRACT

The number of optical channels that may be used to transmit information/data is greatly enhanced using an optical transmission facility having a transmitter that outputs optical signals having respective wavelengths within a first bandwidth, e.g., the C band, combines the latter signal with an optical signal having a wavelength between the first bandwidth and a second bandwidth, e.g., the L-band, and, using a non-linear frequency converter, processes the combined signal to form at least optical signals having wavelengths within the second bandwidth that correspond with the wavelengths of the optical signals within the first bandwidth. In this way, equipment designed for the C band may also be used to process optical signals with another, second band.

13 Claims, 2 Drawing Sheets

CHANNEL BAND CONVERSION APPARATUS FOR OPTICAL TRANSMISSION SYSTEMS

FIELD OF THE INVENTION

The invention relates to optical signal transmission systems, and more particularly relates to optical signal band conversion apparatus.

BACKGROUND OF THE INVENTION

The wavelengths of the optical signals transported over an optical fiber are typically within the so-called C-band, which ranges from 1530 nanometers (nm) to 1562 nm. The wavelengths of the optical signals in the C-band are derived using a semiconductor laser having a crystal and grating that are specifically designed to provide optical emission at those wavelengths. (As is well-known, the crystal provides the laser gain and the grating locks the laser to a specific frequency within the gain bandwidth.) Designers of optical equipment have greatly expanded the number of channels used in the C-band, and are now looking to use the so-called L-band (and other transmission bands, e.g., the so-called S-band) to further increase the number of useful channels that may be multiplexed onto a fiber path. The range of the L-band is from around 1562 nm to 1610 nm. Since the transmission equipment used to transmit optical signals over the C-band is specifically designed for the C-band, it cannot be used to transmit within the L-Band (or S-band). The reason for this is that the various equipments used to transmit optical signals are specifically engineered to operate in the C-band, as mentioned above for the C-band laser. That is, the performance of such equipment peaks in the C-band, but rolls off sharply in the L-band (and other transmission bands, e.g., the S-band). Consequently, one who desires to accurately transmit optical signals in other than the C-band needs to engineer the gain of the transmitter equipment, such as the laser crystal and grating as well as multiplexing equipment, specifically for the desired band, e.g., the L-band. Disadvantageously, it is difficult and expensive to engineer/design a crystal and grating for a laser as well as other transmission equipment to operate in a signal band other than the C-band.

SUMMARY OF THE INVENTION

We address the foregoing problems by employing equipment specifically designed for the C band and converting the C band signals to a second band, e.g., the L or S band, and then output the converted signals in place of the C-band signals. Specifically, in accordance with various aspects of the invention, a transmitter outputs optical signals having respective wavelengths within a first bandwidth, e.g., the C band. The latter signal is then combined with an optical signal having a wavelength between the first bandwidth and a second bandwidth, e.g., the L-band. A non-linear frequency converter processes the combined signal to form at least optical signals having wavelengths within the second bandwidth that correspond with the wavelengths of the optical signals within the first bandwidth. The converted signal is then supplied to respective output terminal, e.g., optical transmission path.

These and other aspects of the invention will be appreciated from the ensuing detailed description and accompanying drawings.

DETAILED DESCRIPTION

Figure 1:
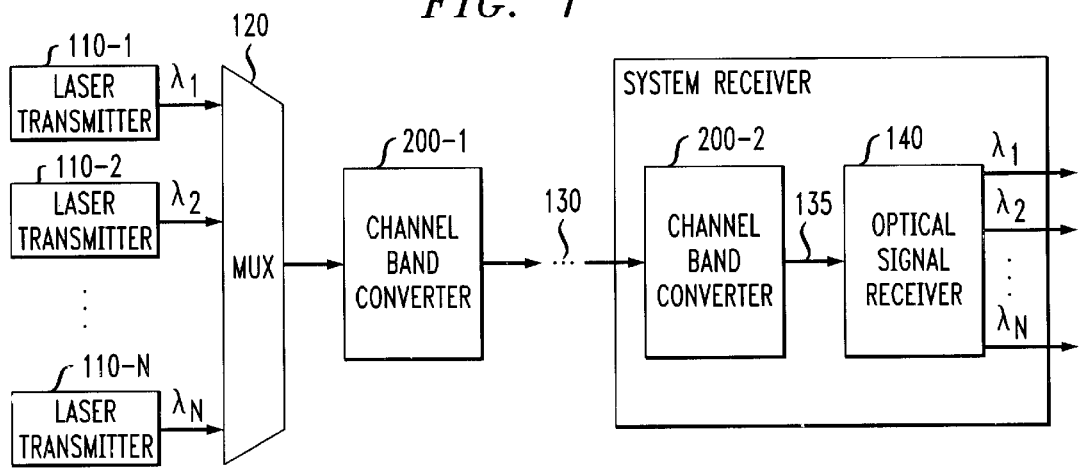
FIG. 1 is a broad block diagram of an optical transmission system in which the principles of the invention may be practiced.

An illustrative optical transmission system embodying the principles of the invention is shown in simplified form in FIG. 1. The optical system, more particularly, includes a plurality of conventional laser transmitters 110-1 through 110-N, multiplexer 120, channel band converters 200-1 and 200-2, optical transmission path 130 and optical receiver 140. Each of the transmitters outputs a respective information bearing optical signal having a unique wavelength, $\lambda_i$, within the C-band. The optical channels are respectively associated with transmitters 110-1 through 110-N. The N channels are identified by their respective wavelengths, $\lambda_1$, $\lambda_2$, $\lambda_3$, ... $\lambda_N$, which are sufficiently separated from one another to prevent signals in adjacent channels from interfering with one another. Such separation may be, for example, 200 GHz or less. The signals that transmitters 110-1 through 110-N output are combined (multiplexed) at conventional optical MUX 120 and then outputted to channel band converter 200-1. Channel band converter 200-1, in accordance with the principles of the invention, converts the wavelengths of the optical signals within a first band, e.g., the C-band, to respective wavelengths within a second band, e.g., the L-band, and outputs the resulting composite signal to optical transmission path 130. Optical transmission path 130 may include one or more optical amplifiers (not shown). Channel band converter 200-2 connected to the other end of path 130 receives the composite optical signal formed from the signals within the second band and then shifts the wavelengths of those signals back to corresponding wavelengths within the first band, e.g., the C-band. Converter 200-2 then supplies the converted composite optical signal to receiver 140. Receiver 140 demultiplexes the received composite signal into the original component optical signals within the C-band and outputs the components signals, $\lambda_1$ through $\lambda_N$, to respective output paths.

Figure 2:
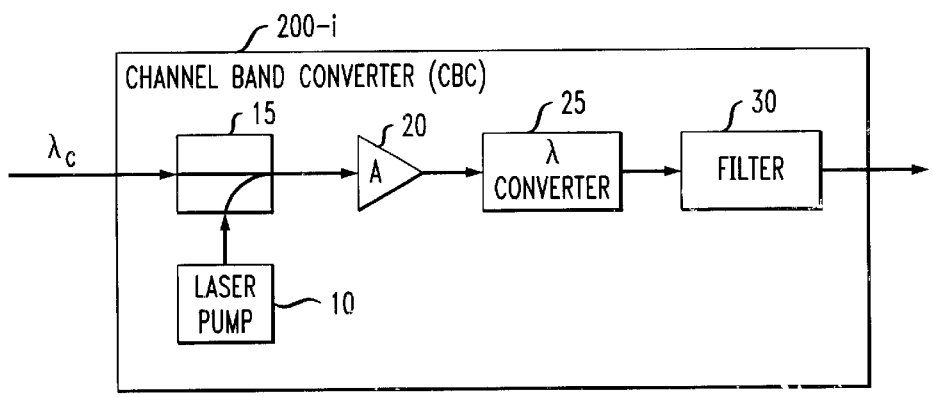
FIG. 2 is a block diagram of a channel converter of FIG. 1.

A broad block diagram of a Channel Band Converter (CBC) 200-$i$ is shown in FIG. 2. CBC 200-$i$, which is non-linear frequency converter that includes, inter alia, a laser pump 10, e.g., a semiconductor pump laser, coupler 15, optional optical amplifier 20, wavelength ($\lambda$) converter 25—illustratively a so-called periodically poled lithium niobate (LiNbo) waveguide—and optical signal filter 30. Specifically, laser pump 10 includes a crystal and grating engineered to output an optical signal having a frequency that is about at the midpoint between the first and second optical bands, e.g., between the C- and L-bands.

Figure 3:
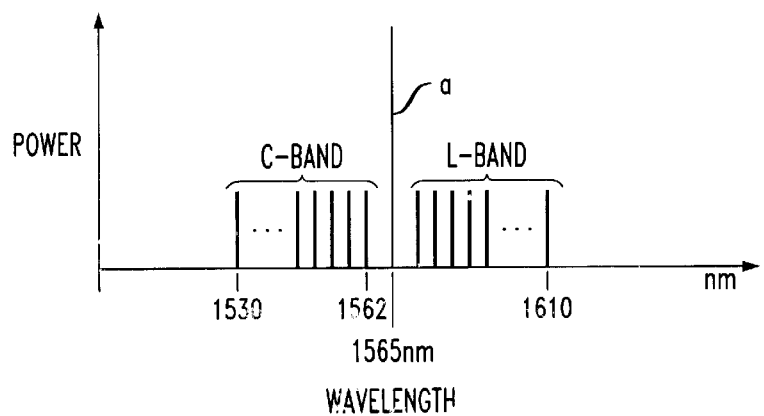
FIG. 3 is a power diagram illustrating the way in which the wave lengths of a signal in a first band are converted to signals in a second band.

An illustrative example of the signal outputted by laser 10 is shown in FIG. 3 as signal 'a' having a wavelength that is about between the first and second bands, shown in the FIG. as the C- and L-bands, respectively. As such, and in accordance the principles of conservation of energy, the second band of signals is located at the spectral image of the laser pump signal and the input waves in the first band. Returning to FIG. 2, coupler 15, which may be, e.g., a conventional WDM combiner, combines the output of laser pump 10 with the incoming composite signal formed from optical signals within the first band of wavelengths, and supplies the resulting signal to optional amplifier 20. Amplifier 20 amplifies the combined signal by a predetermined amplification factor and supplies the amplified signal to non-linear wavelength converter 25. (Note that amplifier 20 may not be needed if laser pump 10 outputs a signal that is of sufficient power.)

Wavelength converter 25, more particularly, processes the combined signal using a non-linear two step function similar to four-wave mixing. First, the laser pump signal optically mixes with an input signal, and second, as a result of such mixing, the laser pump signal is scattered into a new signal in the desired wavelength band. If a plurality of input signal wavelengths are present, then the second step process generates a converted wavelength for each such input wavelength. To say it another way, the second step creates a mirror image of each such input wavelength in the desired signal band, e.g., the L-band. Wavelength converter 25 thus outputs (a) the original signals in the first bandwidth, (b) corresponding signals in the second bandwidth and (c) the laser pump signal. Optical filter 30 in a conventional manner passes and outputs the optical signal in the second (or desired) band and rejects the original optical signals in the first band as well as the laser pump signal.

Figure 4:
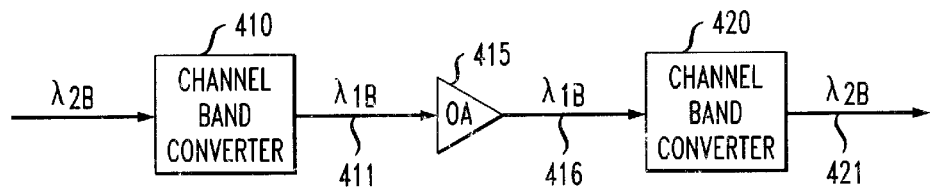
FIG. 4 illustrates one specific application employing the principles of the invention.

FIG. 4 illustrates an application in which optical signals transmitted in the second band may be amplified using an optical amplifier engineered to amplify optical signals in the first band. Specifically, channel converter 410 receives an optical signal formed from one or more optical signals having wavelengths in the second band (designated $\lambda_{2B}$ in the FIG.) and processes the signals in the manner described above. In doing so, converter 410 outputs to path 411 extending to the input of optical amplifier 415 an optical signal formed from corresponding signals having wavelengths in the first band. (the latter signal is designated $\lambda_{1B}$ in the FIG). Optical amplifier 415, which is designed to amplify signals in the first band, is thus capable of amplifying the signal that it receives at its input and output an amplified version of the signal to path 416 extending to channel converter 420. Channel converter 420, in turn, and in the manner described above, processes the signal that it receives at its input and outputs corresponding signals having wavelengths in the second band for transmission over path 421, all in accordance with an aspect of the invention. Advantageously, then, there is no need to re-engineer an optical amplifier designed to amplify signals in one band in order to amplify signals in another, second band.

Figure 5:
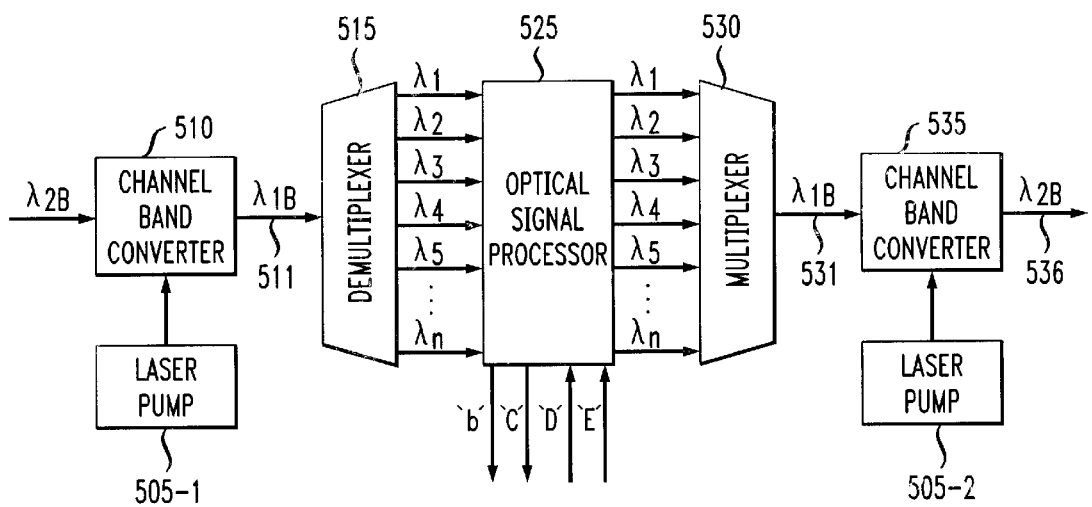
FIG. 5 illustrates another specific application employing the principles of the invention.

FIG. 5 illustrates another application in which optical signals transmitted in the second band may be processed using optical equipment engineered to process optical signals in the first band. In this application an external optical pump 505-$i$ provides the conversion pump signal (signal 'a' in FIG. 3) to its respective channel band converter. In this way, except for the laser pump, the same channel converter may be used in different applications. The external pump would, however, be customized for the particular application. Similarly, channel converter 510 receives an optical signal formed from one or more optical signals having wavelengths in the second band (designated $\lambda_{2B}$ in FIG. 5) and processes the signals in the manner described above. In doing so, converter 510 outputs to path 511 extending to the input of conventional optical demultiplexer (e.g., a so-called WDM demultiplexer) a signal formed from corresponding signals having wavelengths in the first band. (The latter signal is also designated $\lambda_{1B}$ in FIG. 5.) Optical demultiplexer 515, which is designed to demultiplex signals in the first band, is thus capable of demultiplexing the signals it receives at its input, and outputs the demultiplexed signals ($\lambda_1$ through $\lambda_N$) to respective ones of parallel paths extending to optical signal processor 525. Assume that processor 525 performs a so-called drop function, in which information bearing signals $\lambda_3$ and $\lambda_4$, are removed (dropped) from the demultiplexed signal stream and supplied to an external application (not shown) as signals 'b' and 'c'. Also assume that processor 525 performs a so-called add function, in which other information bearing signals 'd' and 'e' are received from an external source (not shown). Processor 525, in turn, performs the "add" function by adding signals 'd' and 'e' to the parallel stream supplied to optical signal multiplexer 530 as signals $\lambda_3$ and $\lambda_4$. Multiplexer 530, in turn, multiplexes the component signals that it receives at its inputs to path 531 extending to channel converter 535. Channel converter 535, in the manner described above, processes the composite signal that it receives at its input and outputs to transmission path 536 corresponding signals having wavelengths in the second band (based on the wavelength of the signal provided by external laser pump 505-2), all in accordance with an aspect of the invention. As a further aspect of the invention, the wavelength of laser pump 505-2 may be set so that the converted optical signals are in a third band, e.g., the S-band, rather than the second band, e.g., the L-band.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope. For example, the above mentioned laser pump may be a wavelength tunable laser pump, in which the desired wavelength may be selected by tuning the wavelength of the tunable laser pump.

We claim:

1. An optical transmission system comprising
   a transmitter that outputs optical signals having respective wavelengths within a first bandwidth,
   an optical signal generator that generates an optical signal having a wavelength outside of the first bandwidth and a second bandwidth, and
   a non-linear frequency converter circuit that combines the outputted optical signals with the generated optical signals and then generates at least optical signals having wavelengths within the second bandwidth that correspond with the wavelengths of the optical signals within the first bandwidth and outputs the newly generated optical signals to an optical transmission path.

2. The optical transmission of claim 1 wherein the converter circuit regenerates the optical signals within the first bandwidth and the optical signal generated by the signal generator, and wherein the converter circuit includes a filter tuned such that only the optical signals within the second bandwidth are outputted to the optical transmission path.

3. The optical transmission system of claim 1 wherein the first bandwidth is the C band and the second bandwidth is the L band.

4. The optical transmission system of claim 1 wherein the first bandwidth is the C band and the second bandwidth is the S band.

5. The optical transmission system of claim 1 wherein the first bandwidth is the L band and the second bandwidth is the S band.

6. The optical transmission system of claim 1 further comprising a system receiver connected to the other end of the transmission path and wherein the system receiver comprises a non-linear frequency converter circuit that combines the optical signals received via the optical transmission path with an optical signal having a wavelength that is outside of the second bandwidth and a third bandwidth and then generates at least optical signals having wavelengths within the third bandwidth that correspond with the wavelengths of the optical signals within the second bandwidth and outputs the newly generated optical signals to an output terminal, and an optical signal demultiplexer that receives the optical signals from the output terminal, demultiplexes the optical signals and forwards the demultiplexed signals to respective recipients.

7. The optical transmission system of claim 6 wherein the first and third bandwidths is the C band and the second bandwidth is the L band.

8. The optical transmission system of claim 6 wherein the first bandwidth is the C band, the second bandwidth is the L band and the third bandwidth is the S band.

9. The optical transmission system of claim 1 wherein the optical signal generator is a wavelength tunable laser pump.

10. The optical transmission system of claim 9 wherein the second bandwidth may be selected by tuning the wavelength of the laser pump.

11. An optical transmission system comprising apparatus that receives via a transmission path an optical signal that is a composite of a plurality of optical signals having respective wavelengths within a first bandwidth;

a first non-linear frequency converter circuit that combines the received optical signal with an optical signal having a wavelength between the first bandwidth and a second bandwidth, then generates at least another optical signal that is a composite of a plurality of optical signals having wavelengths within the second bandwidth that correspond with the wavelengths of the optical signals within the first bandwidth and outputs the other composite optical signal to a respective output terminal;

a demultiplexer that the demultiplexes the other composite optical signal into respective component optical signals;

an optical processor that substitutes a number of other received optical signal components for a like number of the demultiplexed optical signal components and multiplexes the remaining demultiplexed optical signal components with the other received optical signal components and supplies the multiplexed result to a second non-linear converter; and wherein the second non-linear converter combines the multiplexed result signal with an optical signal having a wavelength between the second bandwidth and a third bandwidth, then generates at least another optical signal that is a composite of a plurality of optical signals having wavelengths within the third bandwidth that correspond with the wavelengths of the optical signals within the second bandwidth and outputs the composite optical signal within the third bandwidth to an optical transmission path.

12. The optical transmission system of claim 11 wherein the first and third bandwidths is the L band and the second bandwidth is the C band.

13. The optical transmission system of claim 11 wherein the first and third bandwidths is the S band and the second bandwidth is the C band.

* * * * *